United States Patent Office 2,776,147
Patented Jan. 1, 1957

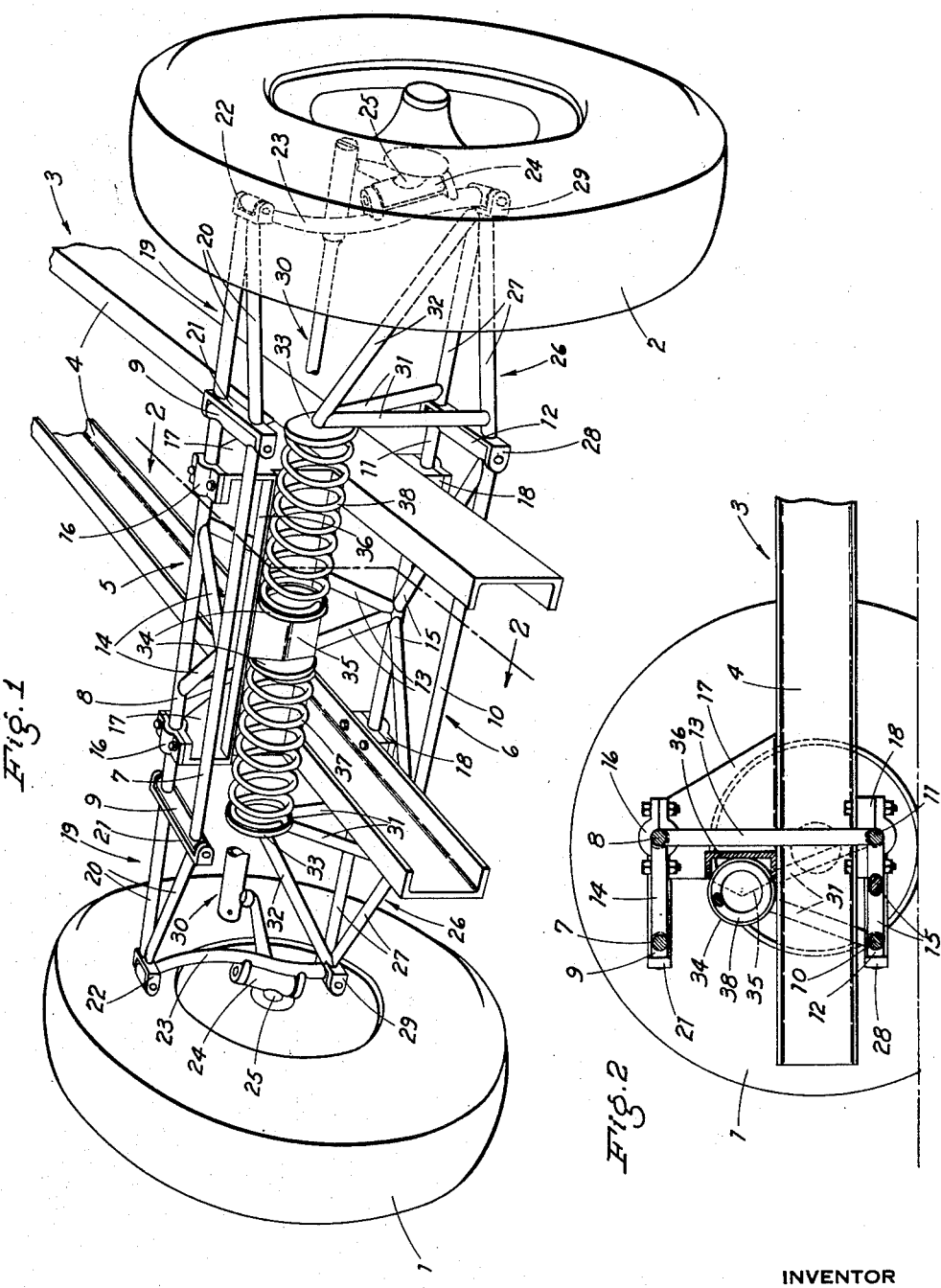

2,776,147

LATERALLY SHIFTABLE WHEEL MOUNTING STRUCTURE FOR AUTOMOBILES

Robert M. Bamford, Live Oak, Calif.

Application August 16, 1954, Serial No. 450,108

4 Claims. (Cl. 280—124)

This invention is directed to, and it is a major object to provide, a novel wheel suspension for automobiles. The invention, while here shown and described as arranged for mounting the front wheels of an automobile, obviously can be used effectively in a rear wheel adaptation.

Another important object of this invention is to provide a wheel suspension which is operative to maintain the automobile body substantially level when rounding corners or during relatively abrupt steering motions, and in which instances centrifugal force otherwise tends to cause the automobile body to tilt or roll laterally in the direction of such force. Also, the suspension means of my inventiontion allows the frame and body of the car to move laterally relative to the wheels without changing the vertical relationship of the frame and wheels; said means including a spring arranged between the frame of the car and the mounting mechanism of the wheels, and which may be compressed without affecting such vertical relationship.

Said suspension means includes, with such spring, seats in which the ends of the spring are seated, and another object of this invention is to provide a linkage connecting the spring seats which alllows the force on one spring seat to balance an equal force on the other spring seat and which also allows the centrifugal force of the body and frame to balance the difference in force on the spring seats caused by the centripetal force being applied at the road surface and not through the center of gravity of the car. Also, and at the same time, the linkage transfers the centrifugal force of the body and frame to the wheels.

Still another object of this invention is to provide a wheel suspension, as in the previous paragraph, which is arranged so that, with the wheels remaining substantially perpendicular to the road, there occurs—due to said centrifugal force—limited relative lateral shifting between the wheels and automobile frame and body; such relative shifting being translated by the suspension into forces which automatically level the automobile frame and body.

A separate object of the invention is to provide a wheel suspension which, in addition to compensating for the centrifugal forces which otherwise cause the automobile body and frame to tilt or roll laterally, works effectively as a road shock arbsorber, and to the end that a minimum of road shock is transmitted to said frame and body.

It is also an object of the invention to provide a suspension system which can be arranged to roll about a point above or below the center of gravity of the car as may be desired, while allowing of a selection on the part of the manufacturer of a wheel-movement controlling arrangement which will have the best available combination of change (or lack of change) in tread, wheel base, caster, camber, and kingpin inclination, combined with the appropriate magnitude of gyroscopic forces caused by wheel deflection.

It is also an object of the invention to provide a wheel suspension which is designed for ease and economy of manufacture; for ready adaptation to automobile structures of present-day type; and for long service, with a minimum of maintenance or repair being required.

Still a further object of the invention is to provide a wheel suspension which is practical, reliable, and durable; yet exceedingly effective for the purpose for which it is designed.

These objects are accomplished by means of such structure and relative arrangement of parts as will fully appear by a perusal of the following specification and claims.

In the drawings:

Fig. 1 is a perspective view of the wheel suspension as arranged in connection between the front wheels of an automobile and the frame of the latter.

Fig. 2 is a transverse sectional elevation on line 2—2 of Fig. 1.

Referring now more particularly to the drawings, and to the characters of reference marked herein, the wheel suspension is here shown as used to mount the front wheels 1 and 2 in connection with an automobile frame, shown in part generally at 3, and which frame includes longitudinal frame beams 4 in transversely spaced relation.

The wheel suspension comprises an upper transverse slide frame, indicated generally at 5, and a lower transverse slide frame, indicated generally at 6; said slide frames being disposed in clearance relation above and below the automobile frame 3, respectively.

The upper transverse slide frame 5 includes a forward transverse rod 7 and a rearward transverse rod 8 disposed in spaced parallel relation; said rods being connected at the ends by cross heads 9.

The lower transverse slide frame 6 is of like construction and includes, in spaced parallel relation, a forward transverse rod 10 and a rearward transverse rod 11; said rods being connected together at the ends by cross heads 12.

The upper slide frame 5 and the lower slide frame 6 are connected together in rigid unitary relation by diagonal bracing 13 which extends between the rods 8 and 11. Additional diagonal bracing, indicated at 14 and 15, connects the rods 7 and 8 of the slide frame 5, and the rods 10 and 11 of the slide frame 6, respectively.

The rearward transverse rod 8 of the upper transverse slide frame 5 is carried—slidably—in upper guide blocks 16 supported by brackets 17 which upstand from corresponding longituidnal frame beams 4; the guide blocks 16 being disposed in spaced relation to the cross heads 9.

The rearward transverse rod 11 of the lower slide frame 6 is carried in lower guide blocks 18 attached to the under side of the related frame beams 4.

With the foregoing arrangement the slide frames 5 and 6 are capable of limited sliding motion as a unit relative to the automobile frame 3.

An upper swing arm unit, indicated generally at 19, projects laterally outwardly from each end of the upper transverse slide frame 5. The swing arm units 19 each include a pair of outwardly converging arms 20, and each such unit is pivoted, at its inner end, by a clevis 21 to the adjacent cross head 9. At its outer end each swing arm unit 19 is pivoted by a clevis 22 to the upper end of the kingpin mounting post 23 for the related wheel 1 or 2. Each post 23 carries a pivotally mounted kingpin 24 from which the wheel spindle 25 projects.

A lower swing arm unit, indicated generally at 26, projects laterally outwardly from each end of the lower transverse slide frame 6.

The lower swing arm units 26 each include a pair of outwardly converging arms 27, and each of said units is pivotally connected, at its inner end, by a clevis 28 to the adjacent cross head 12. At its outer end each lower swing arm unit 26 is pivotally connected by a clevis 29 to the lower end of the related kingpin mounting post 23. Arms 20 and 27 of the upper and lower swing arm units being of equal length, each such upper and lower unit together form a parallel linkage unit connecting the slide frame structure and the adjacent kingpin post 23. The kingpins 24 are connected to a suitable transverse tie rod, indicated generally and in part at 30; steering being effected by the well known fore and aft drag-link type steering unit (not shown).

The lower swing arm units 26 each include, adjacent the inner end, a pair of upwardly converging arms 31 rigid with the arms 27, and forming therewith—in effect—a bellcrank. A diagonal brace 32 connects between the upper ends of the arms 31 and the outer end of each swing arm 26.

At the upper end of the bellcrank defined by the arms 27 and 31 of each swing arm unit 26, there is an outer spring seat 33 of shallow cup form; such spring seat facing, and being alined with, a corresponding inner spring seat 34 mounted on a block 35 or the like fixed centrally in connection with a transverse channel beam 36 secured to, and spanning between, the longitudinal frame beams 4 and brackets 17.

Relatively heavy-duty, compression springs 37 and 38 are engaged, normally under some load, between the corresponding pair of spring seats 33 and 34.

With the above described wheel suspension, and assuming the use of a conventional rear suspension means for the rear wheels of the car, and that the surfaces on which the front and rear wheels rest are transversely parallel, the springs 37 and 38 normally maintain the automobile frame 3 centered between the wheels 1 and 2. Such wheels, by reason of the mounting of each thereof in connection with the corresponding upper swing arm unit 19 and lower swing arm unit 26, may rise and fall, with the related spring providing a shock absorbing action as the wheel traverses the road.

Upon occurrence of any centrifugal force, which would otherwise tend to cause the automobile frame 3 and the body (not shown) thereon to tilt or roll laterally, as when rounding a curve, there occurs a limited, relatively lateral shifting between the wheels and said frame 3; the rods 8 and 11 sliding through the guide blocks 16 and 18.

While said relative shifting between the wheels and the automobile frame is slight, the result is to maintain the automobile frame and body level, with the wheels perpendicular to the road, when said frame and body is subjected to centrifugal force on a turn. This is for the reason that upon occurrence of such centrifugal force, the spring 37 or 38 which is to the outside—i. e. outermost in the direction of such force—is compressed, while the other spring is relatively relieved, and when this occurs the differential in the force which the springs impart to the swing arm units and wheels is such that it compensates for the difference in force on the wheels caused by the centripetal force being applied at the road surface and not through the center of gravity of the car, and the frame and body of the car are maintained substantially level.

In the form of my invention shown in the accompanying drawings, when an additional force is applied to one wheel, not only does the spring on the same side deflect, but so does the spring on the other side, though to a lesser extent. A larger wheel deflection thus results for a given strength spring without increasing the spring deflection caused by a given horizontal force. Also, since an additional force on one wheel causes a somewhat smaller additional force on the opposite wheel, the second force partially balances the first force, and less roll results from a given additional force.

While the wheel suspension as herein described includes helical compression springs 37 and 38, different types of springs or equivalent devices, such as pneumatic struts, can be used in substitution, and effectively, for the intended purpose.

Also, means other than guided slide frames as described may be employed to control relative lateral movement of the car frame and wheels. It will further be appreciated that means other than the equal length control arms described may be employed to control vertical wheel motion; a different linkage arrangement may be employed; and other means for allowing or enabling the spring support to move relative to the wheels may also be employed; all without departing from the spirit of the invention.

From the foregoing description it will be readily seen that there has been produced such a device as will substantially fulfill the objects of the invention, as set forth herein.

While this specification sets forth in detail one form of construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A suspension, for mounting a pair of wheels in connection with a main longitudinal automobile frame disposed therebetween, comprising a pair of vertically spaced transverse frames extending across the main frame, one transverse frame being above and the other below said main frame, means connecting the transverse frames as a rigid unit, a pair of vertically spaced swingable equal length parallel arms pivoted to and projecting laterally outward from each end of the transverse frames, a post pivoted to and extending between the outer ends of adjacent swingable arms, means mounting the corresponding wheel on each post, one each of the arms at each end of the transverse frame unit being included in a bellcrank lever disposed in a vertical transverse plane, an inwardly extending compression spring engaged between the free arm of each bellcrank lever and the main frame, and guide means mounting the transverse frame on the main frame for relative sliding motion in a fixed plane transversely of the main frame.

2. A suspension, for mounting a pair of wheels in connection with a main longitudinal automobile frame disposed therebetween, comprising a pair of vertically spaced transverse frames extending across the main frame, one transverse frame being above and the other below said main frame, each of said transverse frames including a forward rod, a rearward rod, and cross heads connecting said rods together at adjacent ends; means connecting the transverse frames as a rigid unit, guide means between one rod of each transverse frame and the main frame supporting the transverse frame unit for relative transverse sliding motion, upper and lower arms projecting outwardly from the ends of the corresponding transverse frames, a clevis pivotally connecting each arm at the inner end to the adjacent cross head for relative vertical swinging motion, a post pivoted to and extending between the outer ends of adjacent swingable arms, means mounting the corresponding wheel on each post, one each of the arms at each end of the transverse frame unit being included in a bellcrank lever disposed in a vertical transverse plane, the free arms of the bellcrank levers being alined transversely of the main frame, a stop member fixed in connection with the main frame and disposed at a central point in alinement between said free arms, and a compression spring engaged between each of said free arms and said stop member.

3. A suspension, for mounting a pair of wheels in connection with a main longitudinal automobile frame disposed therebetween, comprising an upper transverse slide frame disposed above, and a lower transverse slide frame disposed below, said main frame, each of said slide frames including a forward and rearward transverse rod in spaced parallel relation, and cross heads connecting the rods of each slide frame at the ends thereof; transversely spaced bearing blocks secured in connection with the main frame above and below the same, said bearing blocks slidably receiving one of the rods of the adjacent transverse slide frame, a clevis pivoted in connection with each cross head for swinging about a longitudinal axis, an arm projecting laterally outwardly from each clevis, a post pivotally connected to and extending between the outer ends of adjacent upper and lower arms, means mounting each wheel in connection with the adjacent post, another arm upstanding from each of the lowermost ones of said first named arms, said other arms being in alinement transversely of the main frame, a central stop member fixed in connection with the main frame in alinement between said other arms, and a compression spring engaged between each of said other arms and said stop member.

4. Means for mounting a pair of wheels in connection with a main longitudinal automobile frame disposed therebetween, said means comprising a transverse frame unit extending across the main frame, means mounting the transverse frame unit on the main frame for relative sliding motion transversely of the latter, while maintaining the frames parallel to each other transversely, the wheels each having an axial spindle, means including a parallel linkage vertically swingable arm unit for each wheel connecting the corresponding spindle and the adjacent end of the transverse frame unit, and spring means between each arm unit and the main frame yieldably resisting upward swinging of said arm unit.

References Cited in the file of this patent

UNITED STATES PATENTS

| | | |
|---|---|---|
| 1,423,002 | Mercier | July 18, 1922 |
| 2,121,720 | Wedelstaedt | June 21, 1938 |
| 2,634,988 | Porte | Apr. 14, 1953 |
| 2,689,747 | Kolbe | Sept. 21, 1954 |
| 2,701,727 | Linn | Feb. 8, 1955 |

FOREIGN PATENTS

| | | |
|---|---|---|
| 354,676 | Germany | June 12, 1922 |